United States Patent [19]

Novak

[11] Patent Number: 5,602,486
[45] Date of Patent: Feb. 11, 1997

[54] IMPEDANCE SENSING OF FLAWS IN NON-HOMOGENOUS MATERIALS

[75] Inventor: James L. Novak, Albuquerque, N.M.

[73] Assignee: Sandia Corporation, Albuquerque, N.M.

[21] Appl. No.: 336,999

[22] Filed: Nov. 10, 1994

Related U.S. Application Data

[63] Continuation-in-part of Ser. No. 213,438, Mar. 14, 1994, Pat. No. 5,537,048.

[51] Int. Cl.6 .......................... G01N 27/02; G01R 27/02
[52] U.S. Cl. .................. 324/671; 324/663; 324/686; 324/693; 324/699; 324/722; 324/519; 324/525
[58] Field of Search ........................... 324/519, 521, 324/525, 555, 663, 671, 683, 686, 693, 699, 709, 722, 76, 78

[56] References Cited

U.S. PATENT DOCUMENTS

| | | | |
|---|---|---|---|
| 3,676,933 | 7/1972 | Slone | 33/147 L |
| 3,730,086 | 5/1973 | Dauterman | 101/148 |
| 4,074,184 | 2/1978 | Dechene et al. | 324/434 |
| 4,166,244 | 8/1979 | Woods et al. | 324/693 |
| 4,207,141 | 6/1980 | Seymour | 162/49 |
| 4,426,785 | 1/1984 | Loftus et al. | 33/147 L |
| 4,429,308 | 1/1984 | Shankle | 324/683 X |
| 4,433,332 | 2/1984 | Wason | 324/683 X |
| 4,593,244 | 6/1986 | Summers et al. | 324/230 |
| 4,623,835 | 11/1986 | Mehdizadeh et al. | 324/58.5 R |
| 4,677,578 | 6/1987 | Wright et al. | 364/562 |
| 4,682,105 | 7/1987 | Thorn | 324/230 |
| 4,862,065 | 8/1989 | Pazda et al. | 324/65 R |
| 4,958,131 | 9/1990 | Thorn | 324/708 |
| 4,959,040 | 9/1990 | Gardner et al. | 474/103 |
| 4,968,947 | 11/1990 | Thorn | 324/701 |
| 4,972,154 | 11/1990 | Bechtel et al. | 324/663 |
| 4,975,645 | 12/1990 | Lucas | 324/663 X |
| 5,001,435 | 3/1991 | Smith | 324/671 |
| 5,095,278 | 3/1992 | Hendrick | 324/687 |
| 5,130,661 | 7/1992 | Beck et al. | 324/663 |
| 5,212,452 | 5/1993 | Mayer et al. | 324/687 |
| 5,281,921 | 1/1994 | Novak et al. | 324/671 |
| 5,394,097 | 2/1995 | Bechtel et al. | 324/687 |

FOREIGN PATENT DOCUMENTS

| | | | |
|---|---|---|---|
| 1522852 | 4/1968 | France | 324/701 |
| 1257306 | 12/1971 | United Kingdom | 324/671 |

OTHER PUBLICATIONS

Advertisement, strip-edge scanner, marketed by ABB Automation AB, Vasteras, Sweden, SR vol. 13 No. 2, 1993 (no month available).

Advertistement, rotary electrical contact assemblies by Rotocon, Meridian Laboratory, Middleton, Wisconsin (no date available).

Shadwell, P. W. and Daniels, D. J. "Critical Survey of Non-Destructive Testing Techniques for Non Conducting Materials." *ERA Technology Limited*, ERA Report 92-01-9R, May 1992.

*Primary Examiner*—Kenneth A. Wieder
*Assistant Examiner*—Glenn W. Brown

[57] ABSTRACT

An apparatus and method for sensing impedances of materials placed in contact therewith. The invention comprises a plurality of drive electrodes and one or more sense electrodes. Both rotating electric fields and differently shaped electric fields are provided for, as are analysis of structure and composition at different orientations and depths.

39 Claims, 7 Drawing Sheets

Image A

FIG. 7A

Image B

FIG. 7B

Image E

FIG. 7C

Image F

FIG. 7D

IMPEDANCE SENSING OF FLAWS IN NON-HOMOGENOUS MATERIALS

GOVERNMENT RIGHTS

The Government has rights to this invention pursuant to Contract No. DE-AC04-76DP00789 awarded by the U.S. Department of Energy.

CROSS-REFERENCE TO RELATED APPLICATIONS

This application is a continuation-in-part application of U.S. patent application Ser. No. 08/213,438, entitled "Sensing Roller for In-Process Thickness Measurement", to James L. Novak, filed on Mar. 14, 1994, now U.S. Pat. No. 5,537,048 on Jul. 16, 1996 the teachings of which are incorporated herein by reference.

BACKGROUND OF THE INVENTION

1. Field of the Invention (Technical Field)

The present invention relates to the detection of flaws in manufactured articles which are non-homogenous.

2. Background Art

Ceramics, composites, textiles, and other nonmetallic engineered materials are superior to traditional materials in many applications with demanding performance specifications. For example, the properties of some nonmetallic materials can be varied to produce anisotropic component structural properties which improve strength to weight ratios. The use of these new materials allows the composition of a component, in addition to its physical geometry, to be spatially altered to perform to the given specifications.

However, the additional performance potential of these engineered materials greatly increases the complexity of component design, manufacture, and use. It is widely recognized that no single nondestructive evaluation (NDE) technique is capable of fully evaluating component performance. Shadwell, P. W. and Daniels, D. J., "Critical Survey of Non-Destructive Testing Techniques for Non-Conducting Materials," ERA Technology Limited Report 92-0109R (May 1992). Accordingly, a wide variety of NDE techniques have been developed to permit the verification of design models, the identification of manufacturing flaws, and the assessment of service-related damage. Many of these techniques rely fundamentally on forming spatial maps of a particular material property, such as ultrasonic propagation velocities (C-scans). The measurement of the spatial variation of a material property allows the coupling between composition, geometry, and performance to be evaluated.

The present invention is of an NDE technique and apparatus that measures geometry and structural variations in nonmetallic engineered materials via impedance mapping. Unlike previous impedance-based experiments, such as those described in Kranbuehl, D. E., "In-situ on-line measurement of composite cure with frequency dependent electromagnetic sensors," *Plastics, Rubber, and Composites Processing and Applications* 16:213–219 (1991), the present invention measures features of the final, cured component and not of the material properties of the bulk material. Spatial variations in the impedances measured in this technique reflect differences in geometry and structure such as thickness, arrangement of reinforcing plies, and inhomogeneities such as voids and delaminations. This technique will be applicable in a variety of manufacturing operations which form a material into a component, rather than material property analyses that focus on the material itself.

Previous work has determined that the complex permittivity (proportional to impedance) of a bulk nonmetallic material can be used to assess its chemical state. Kranbuehl, Supra. Variations in chemical bonding versus time are calculated from the complex dielectric constant using empirically determined relationships. However, these measurements are very sensitive to the geometry and physical configuration of the sample, as well as the spatial distribution of the imposed electric field. For these reasons, large, uniform samples of the nonmetallic material are required, and only gross material properties may be determined.

The applicant has previously developed the capability to create time-varying, spatially restricted, airborne electric fields through appropriate design of sensing element electrodes. Novak, J. L., and Wiczer, J. J., "A high resolution capacitive imaging sensor for manufacturing applications," *Proc. IEEE Int. Conf. Robotics and Automation* (1991); and U.S. Pat. No. 5,281,921, entitled "Non-contact capacitance based image sensing method and system," to Novak et al., issued Jan. 24, 1994. However, that device employs a capacitive sensing technique, which may be used only on highly conductive materials. It cannot be used on materials of arbitrary composition, as can the present invention. In addition, the capacitive technique senses the standpoint distance between the sensor and the material being tested, rendering it insensitive to the internal structure of the material.

Some work involving nondestructive testing of dielectric and conductive materials has been done using multielectrode capacitances for nondestructive evaluation. P. J. Shull et al., "Applications of capacitive array sensors to nondestructive evaluation," *Rev. Prog. Quantitative Nondestructive Evaluation* 7A:517–523 (1988). However, these techniques focus on a noncontacting method approaching the surface under test itself. In addition, they incorporate multiple electrodes to produce a single electric field of different shapes. The sensor of the present invention does not require access to the surface under test, but functions best when contacting the opposite side of the dielectric substrate. This invention uses multiple electrodes to generate independent electric fields to produce independent effective sensing volumes (ESVs).

A technique to measure paint thickness over a conductive coating on a dielectric substrate by contacting the dry surface itself is disclosed in U.S. Pat. No. 5,093,626, entitled "Contact measuring device for determining the dry film thickness of a paint on a conductive primer adhered to a plastic substrate," to Baer, et al., issued Mar. 3, 1992. This technique allows precise measurement of a thin, dry paint film over a conductive material on a dielectric substrate. However, it requires both contact with the surface under test and the presence of a conductive layer just below the layer of dielectric material.

SUMMARY OF THE INVENTION (DISCLOSURE OF THE INVENTION)

The present invention is of an apparatus and a method for sensing an impedance, comprising: providing a plurality of drive electrodes; supplying one or more sense electrodes; connecting one or more signal sources to the drive electrodes such that each of the drive electrodes operates only at periodic intervals or at different electrical phases; and determining an impedance value between at least one of the sense electrodes and at least one of the drive electrodes. In the preferred embodiment, the plurality of drive electrodes are placed in a ring about a single sense electrode, such as by connecting four arcuate electrodes and the one or more signal sources such that the four arcuate drive electrodes operate in sequence for equal intervals. Each of the drive electrodes may be paired with a unique sense electrode. At least one of the pairs may be spaced at a distance different than that of at least one other of the pairs, which will permit determining impedance values at different depths within a sample material. The pairs may be placed to form a ring or a plurality of concentric rings. Preferably, dynamic range is enhanced, one or more oscillators are employed, and a rotating electric field is generated. An effective sensing volume may be generated by the overlap of electric fields generated by two pairs of drive and sense electrodes. An object may be mechanically scanned to acquire an impedance mapping of the object, or an array of sense electrodes may be employed.

The invention is also of an impedance sensing apparatus comprising a plurality of paired electrodes, each of the pairs comprising a drive electrode and a sense electrode, driven by one or more signal sources, each of the pairs having a distance between them different than a distance between at least one other pair. In the preferred embodiment, the apparatus also comprises an impedance value reader connected to the sense electrodes for reading an impedance value for a sample material in contact with the plurality of paired electrodes. Preferably, each of the plurality of paired electrodes provides impedance readings to a depth of the sample material different than a depth read by at least one other pair.

The invention is additionally of an impedance sensing apparatus comprising a plurality of electrodes placed in a ring and driven by a signal source such that the electrode being driven rotates around the ring, thereby generating an electric field which rotates about an axis. In the preferred embodiment, a sense electrode is placed at a center of the ring or a second plurality of electrodes, comprising sense electrodes, is employed and placed in the ring. In the second case, the second plurality of electrodes is identical in number to and paired with the first plurality of electrodes, and one of the pairs of electrodes provides impedance sensing to a different depth than another of the pairs. The apparatus may additionally comprise a second plurality of electrodes placed in a second ring of a different diameter than that of the first ring.

The primary object of the present invention is to provide a impedance sensor capable of detecting flaws in non-homogenous manufactured materials.

The primary advantage of the present invention is that it is capable of detecting properties of a final, cured component, or a component in an intermediate stage of manufacture, rather than being limited to material properties of bulk materials.

An advantage of the present invention is that the overall life cycle cost of products utilizing nonmetallic engineered materials can be reduced through use of the invention for in-process and in-service inspection.

Another advantage of the present invention is that product tolerances can be maintained through feedback control, resulting in reduced waste.

Still another advantage of the present invention is that field inspection of components, such as panels on aircraft, will permit repair or replacement based upon structural integrity, rather than on a predetermined maintenance schedule.

Yet another advantage of the present invention is that it permits monitoring and control of the fundamental process of patterning layers of dielectric and conductive material on glass substrates, and so can be applied during the manufacture of virtually any type of Flat Panel Display (FPD).

An additional advantage of the present invention is that it improves the quality and yield of FPD manufacturing processes by permitting: (1) characterizing the material properties and dimensions of incoming glass substrates; (2) controlling the evaporation and patterning of conductors, including transparent conductors such as indium-tin oxide; (3) controlling the screen-printing of multiple dielectric layers and phosphors; and (4) performing a final inspection prior to sealing.

A final advantage of the present invention is its ability to generate multiple effective sensing volumes, which allows simultaneous measurement of material thicknesses in, for example, multi-coat painting processes. A single sensor, for example, can determine the thickness of a dielectric part, the thickness of a layer of primer, and the thickness of the multiple color coats in a painting process.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS (BEST MODES FOR CARRYING OUT THE INVENTION)

The present invention is of a method and apparatus for detecting anomalies in non-homogenous manufactured materials in a non-destructive manner. The invention employs sensing elements and an impedance mapping technique, as described herein.

The present invention places the sensing elements in contact with a nonmetallic component, resulting in an imposed potential in an electric field which will interact with various internal structures of the component. The amplitude and phase of the resulting electric displacement current can be used to calculate the complex value of the local impedance. Resistive structures, such as reinforcing carbon fiber, enhance the real impedance component, while the imaginary component is altered to differing degrees by the presence of voids, delaminations, or intact resin. In addition, because of expected electrical nonlinearities in the materials, the excitation frequency and amplitude are preferably independently varied to provide a multidimensional image.

Figure 1:
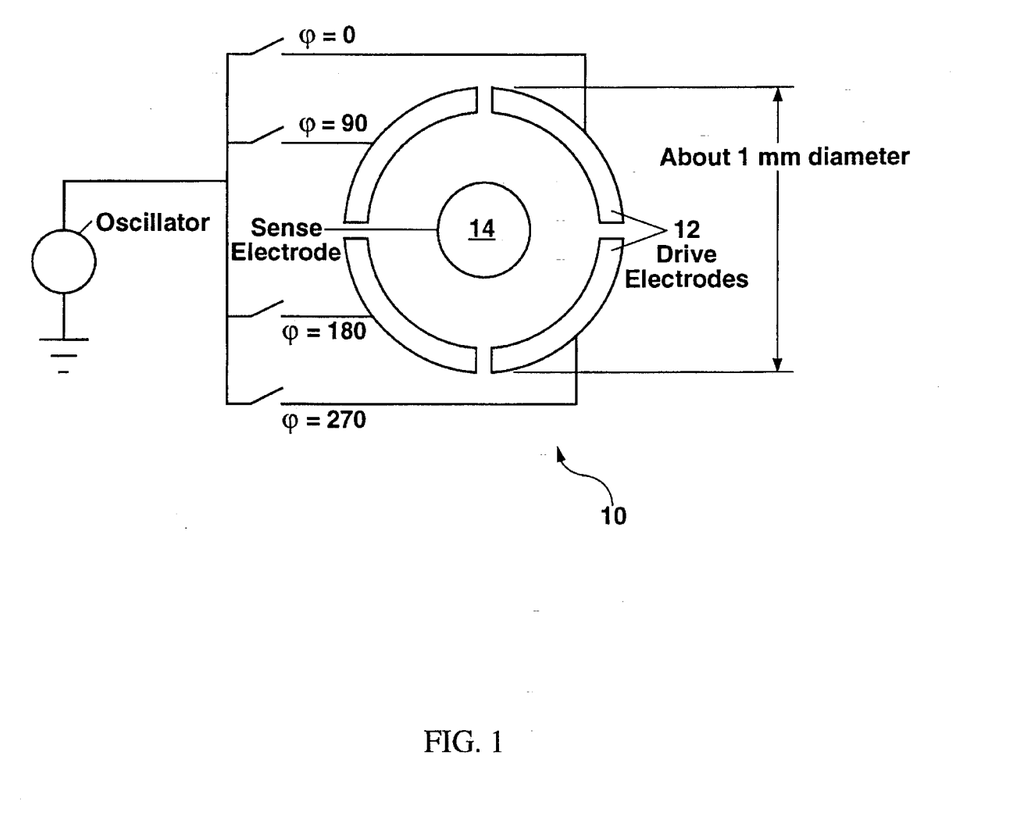
FIG. 1 is a diagram of the rotating electric field embodiment of the impedance sensing element of the invention.

Because many nonconductive engineered materials are anisotropic, the measured impedances will vary depending on the spatial orientation of the electric field. This property can be exploited by developing a rotating electric field using segmented electrodes driven at different phases, or switched in sequence. An illustration of such an embodiment using a four-quadrant field is given in FIG. 1. The overall diameter of the sensing element 10 is preferably about 1 mm (0.040"). The outer ring of driving electrodes 12 are activated in sequence, resulting in an electric field that "rotates" about the center axis and sense electrode 14. Individual sensing elements are mechanically scanned over the surface of the component or arranged in a two-dimensional array to acquire an impedance image. By monitoring the impedance as a function of rotational "position," one obtains multidimensional maps of the complex impedance, Z, versus spatial location (x,y), field orientation ($\phi$), excitation frequency ($\omega$), and amplitude (A) such that $Z=f(x, y, \phi, \omega, A)$.

With the resulting impedance images, the location of an impedance anomaly may be correlated with the location of a flaw in the component under test. Because the individual data elements are related spatially, distributed effects such as propagating forms of delamination can be examined and their origin determined. Image processing techniques, such as spatial filtering and correlation, may also be used to enhance features not readily identifiable using single-point measurements. For example, correlations between different areas of an image could be used to detect manufacturing flaws or fatigue-induced damage.

The proposed sensing technology differs from existing impedance-based NDE techniques in that it relates the electrical properties of nonmetallic engineering materials with the part geometry. It has been well established that bulk impedance measuring techniques can be used to control material manufacturing processes. The present invention is of a sensing technology that may be used during the manufacture and use of components fabricated from these specialized materials.

Small breaks in reinforcing fibers, the presence of voids, and service-induced delamination are examples of flaws that are likely to result in measurable changes in the electrical properties of a component under test. By measuring small, local impedance variations in components, real-time NDE can be performed, permitting rapid modification of the manufacturing process or field component replacement. Many current NDE inspection technologies are difficult to use except in special testing cells. The impedance imaging sensor of the present invention can be incorporated into manufacturing equipment or incorporated into a fieldable test instrument.

The ability to rotate the imposed electric field is a unique feature of the impedance sensor design of the present invention. By varying the angle between the imposed electric field and the surface of the component under test, anisotropicities can be observed. This allows directional flaws such as fiber breakage to be observed. The rotation angle, the spatial location, the frequency, and the amplitude of the applied electric field provide the independent variables for multidimensional maps of the electrical properties.

An alternative embodiment of the present invention is especially useful in monitoring the manufacturing of flat panel displays (FPDs), although it is useful in a wide variety of other applications. FPDs have the advantages over conventional cathode ray tubes that they offer a low weight, a thin profile, and low power consumption. As the size of the FPD increases to meet high-definition television (HDTV) requirements, the manufacturing yield will decrease dramatically. This is because the manufacturing of large FPDs requires the use of microlithography over much larger areas than is required in typical integrated circuit fabrication. Manufacturing systems which are capable of holding the required tolerances are not yet available.

Most FPDs are formed by sandwiching the specially-prepared surfaces of two glass plates together. These internal surfaces consist of multiple layers of conductors, dielectrics, phosphors, and other materials. The pattern and composition of these layers depend on the particular display technology. After depositing a bead of adhesive surrounding these layers, the two plates are pressed together to form a sealed, laminated structure. The quality of the various internal layers directly impacts the image uniformity and the efficiency of the conversion from electrical to light energy. Improperly deposited conductor patterns, for example, can result in objectionable lines or spots in the final image. Any spatial variations in dielectric layer thickness are directly visible as unacceptable gradations in intensity and color. In order to produce high-quality displays, it is critical to deposit layers of material uniformly over the entire viewing area of the FPD.

The present invention can dramatically improve FPD manufacturing efficiency by sensing layer deposition processes in real-time, permitting on-line feedback control or inspection immediately after deposition. It can be used to monitor and/or control the precise deposition of uniform, structured layers of dielectric or conductive material over large areas on a substrate.

Figure 2:
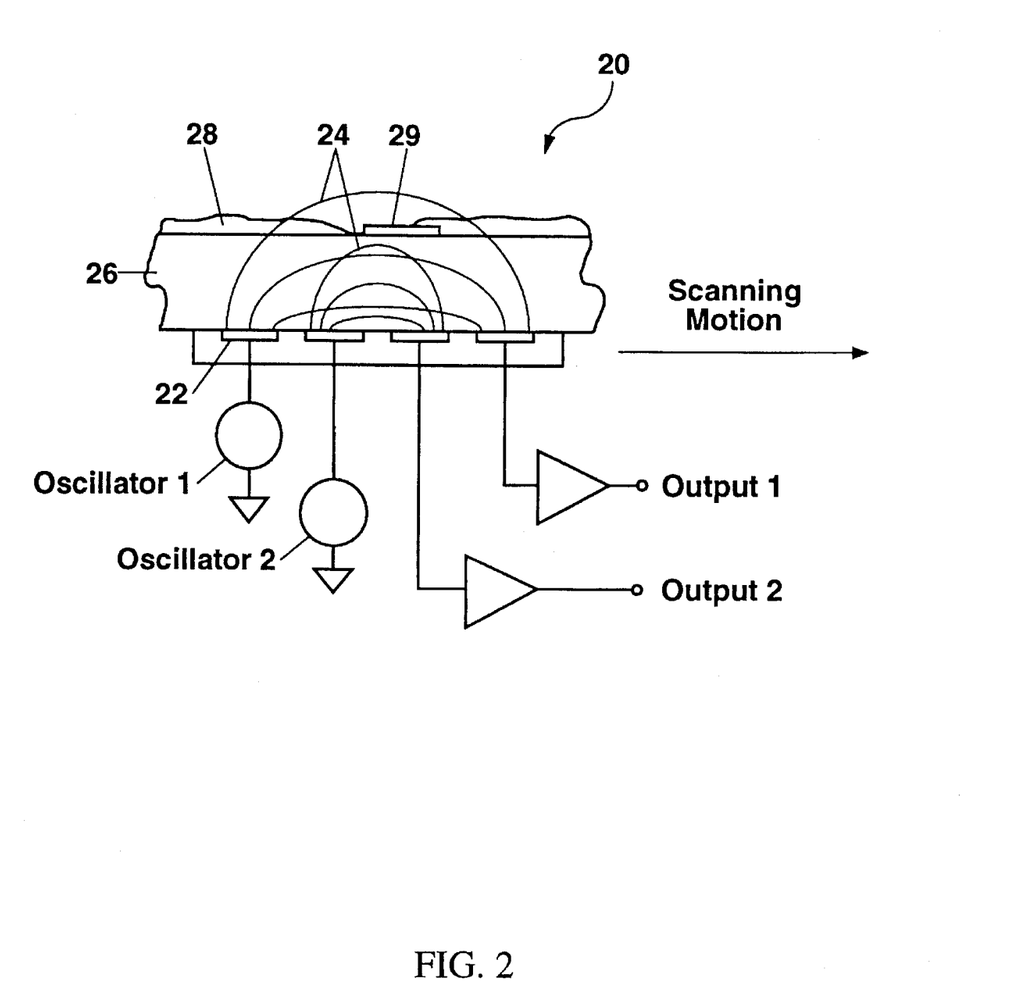
FIG. 2 is a diagram of the effective sensing volume embodiment of the impedance sensing element of the invention.

The alternative embodiment useful in FPD applications is shown in FIG. 2. The FPD inspection sensor 20 comprises multiple photopatterned electrodes 22 in a mechanically rugged structure, such as a printed circuit board or multichip module. The sensor is placed in contact with the "external" surface of a glass FPD substrate 26. Each sensor element consists of multiple electrode pairs which generate spatially-resolved electric fields 24. These electric fields occupy a volume of space which is related to the electrode geometry. Variations in the geometry and/or composition of the material occupying these volumes leads to changes in the associated displacement current. While in theory these fields extend to infinity, measurement noise limits the ability to detect variations far from the electrodes. This limitation results in the concept of an "effective sensing volume" (ESV) associated with a particular pair of electrodes. Multiple electrode pairs can be fabricated with ESVs that optimally interact with layers under test. The multiple, overlapping ESVs interact with different volumes within the glass substrate and the dielectric 28 and conductive 29 layers on the "internal" side as indicated in FIG. 2. Variations in the measured displacement current flowing between each pair of electrodes are sensed using amplitude- and phase-sensitive detection circuitry. Differences between the signals from the two sensing volumes will provide an accurate measurement of the variations in the thickness of dielectric layers and the location of conductive layers. This volumetric differencing technique automatically rejects common-mode fluctuations, such as variations in the glass substrate or in the operating temperature.

Figure 3:
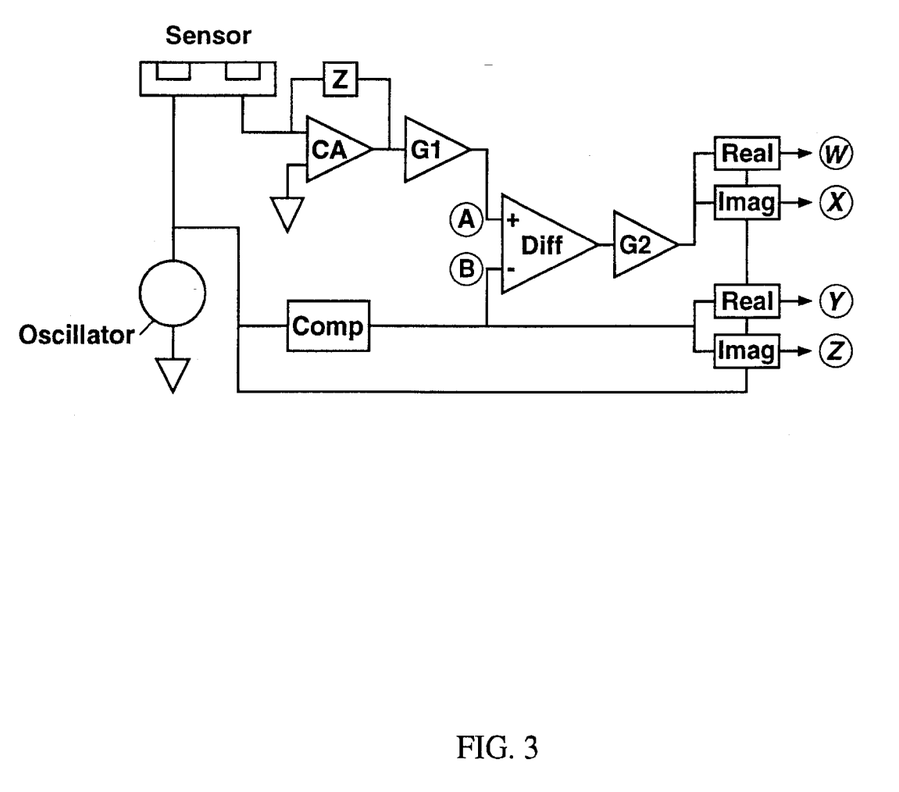
FIG. 3 is a block diagram of a device for enhancing the sensor dynamic range of the embodiment of FIG. 2.

The variations in displacement current corresponding to the features of interest are substantially smaller than the total displacement current flowing through the ESV. The electronic gain required to adequately detect these small changes, when applied to the total displacement current signal, results in saturation of the signal processing electronics. For this reason, dedicated compensation circuitry was developed to enhance the measurement dynamic range by providing a high gain amplification of only the small signals of interest. FIG. 3 is a block diagram of the preferred apparatus for enhancing the dynamic range for one pair of sensing electrodes. The oscillator (Osc) produces a constant voltage signal which drives one electrode of the pair. The second electrode is connected to a charge amplifier (CA) which buffers the signal and eliminates the effect of parasitic capacitances to ground due the effect of a virtual ground. The feedback element, Z, is typically a small capacitor in parallel with a large resistor. The charge amplifier signal is amplitude and phase modulated by the geometry and composition of the material within the ESV. The output signal of the charge amplifier is amplified at stage G1 such that the signal at point A is as large as possible without distortion. Generally, the allowable gain at this stage is still insufficient to extract the small variations of interest. A compensation signal B is subtracted from the signal at point A at the differencing stage (Diff) to eliminate the effect of the substrate on the output signal. This compensation signal B is derived from the oscillator, through compensation sensors or electrical adjustment of the amplitude and phase while the sensor is at a reference position on the FPD panel (Comp). The output from the differencing stage is then amplified and the amplitude and phase of the compensated signal determined using conventional in-phase and quadrature synchronous detection techniques to extract the real and imaginary signal components W and X. The original oscillator signal is used to provide the clock reference. At the same time, the real and imaginary components of the compensation signal are also generated at points Y and Z. The analog outputs W, X, Y, and Z are then digitized using the A/D converters. A computer program is then used to compute the original real and imaginary component of the signal at point A through the equations, $$A(real)=W+G2Y$$

and $$A(imag)=X+G2Z.$$

Because the transfer function of the charge amplifier (CA) and gain G1 are known, the impedance of the sensor itself can be calculated using these relationships.

By recording information from multiple ESVs at multiple sites, precise spatial maps or images of the thickness of the glass substrate and dielectric layers can be obtained. This data may be acquired by mechanically scanning a single sensor (incorporating multiple ESV elements) or by utilizing arrays of multiple devices. The thickness of dielectric layers may be precisely measured using this technique.

The glass substrates used in FPD construction are much thicker than the thin dielectric layer over, for example, indium tin oxide electrodes. The interposition of the thick glass substrate between the sensor and the layer under test results in a spatially filtered image. While this is not a problem when measuring the thickness of dielectric layers, some postprocessing is required to sharpen the images prior to making width and geometry measurements for conductors and dielectric pads. The use of multiple ESVs is critical to permit discrimination between the substrate and among different material layers. Matched filtering techniques may be used in conjunction with the multiple ESVs to cancel out "bulk" effects, using the electrical and physical properties of the FPD substrate. Since these properties will be quite uniform in the region near the sensing field, an accurate reconstruction of the layer under test will be possible.

The FPD sensor of the present invention represents a departure from currently available FPD testing technologies that focus on inspecting a near-final product. Defects detected with conventional techniques can prevent shipping a flawed product, but cannot be used for feedback control of individual deposition or patterning processes. Because this sensor makes measurements through the glass substrate, from the back side, it can be physically located outside a vacuum chamber or a clean-room environment. Thus, it may be used to inspect substrates following each individual processing step, eliminating the possibility of adding value to unacceptably flawed components. Uncured or "green" layers can be inspected prior to curing, potentially allowing cleaning and reprocessing. Metal evaporation processes could be actively monitored to permit real-time control of deposition thickness and uniformity. Both of these capabilities can significantly reduce manufacturing costs and waste.

Furthermore, the sensor of the present invention acquires spatially-resolved maps of the electrical properties and geometry of each layer in a FPD. These factors are critical to the performance of FPDs, and yet no other available sensor technology can make these measurements. The individual layers do not need to be functional in order for their quality to be assessed. Currently available inspection technologies, on the other hand, typically measure optical properties or material density (X-rays) to infer thickness, relying on transmitted or reflected energy to form an image. Many of the optical measurements require that the FPD be "exercised" during sensing to generate appropriate optical test patterns. This requires that some degree of FPD functionality be attained prior to inspection. As a result, this type of testing must be performed toward the end of FPD production, at a stage when a significant amount of value has been added to each part.

The FPD sensing technology of the present invention enables in-process measurements that are critical to improving FPD quality and yield. As the demand for better FPDs grows, continuous quality and yield improvements in conjunction with manufacturing cost reductions will be crucial to obtaining and maintaining market share. Present final inspection techniques can eliminate poor quality FPDs, but the cost of rejection is substantial because of the value that has been added to the flawed part. It is critically important to incorporate feedback control using sensors to permit rework of out-of-tolerance components, or to reject unacceptable parts early, before additional value is added. Because of the volume and cost of FPDs, even incremental improvements in yield have enormous economic implications.

Industrial Applicability:

The invention is further illustrated by the following non-limiting examples.

EXAMPLE 1

Figure 4:
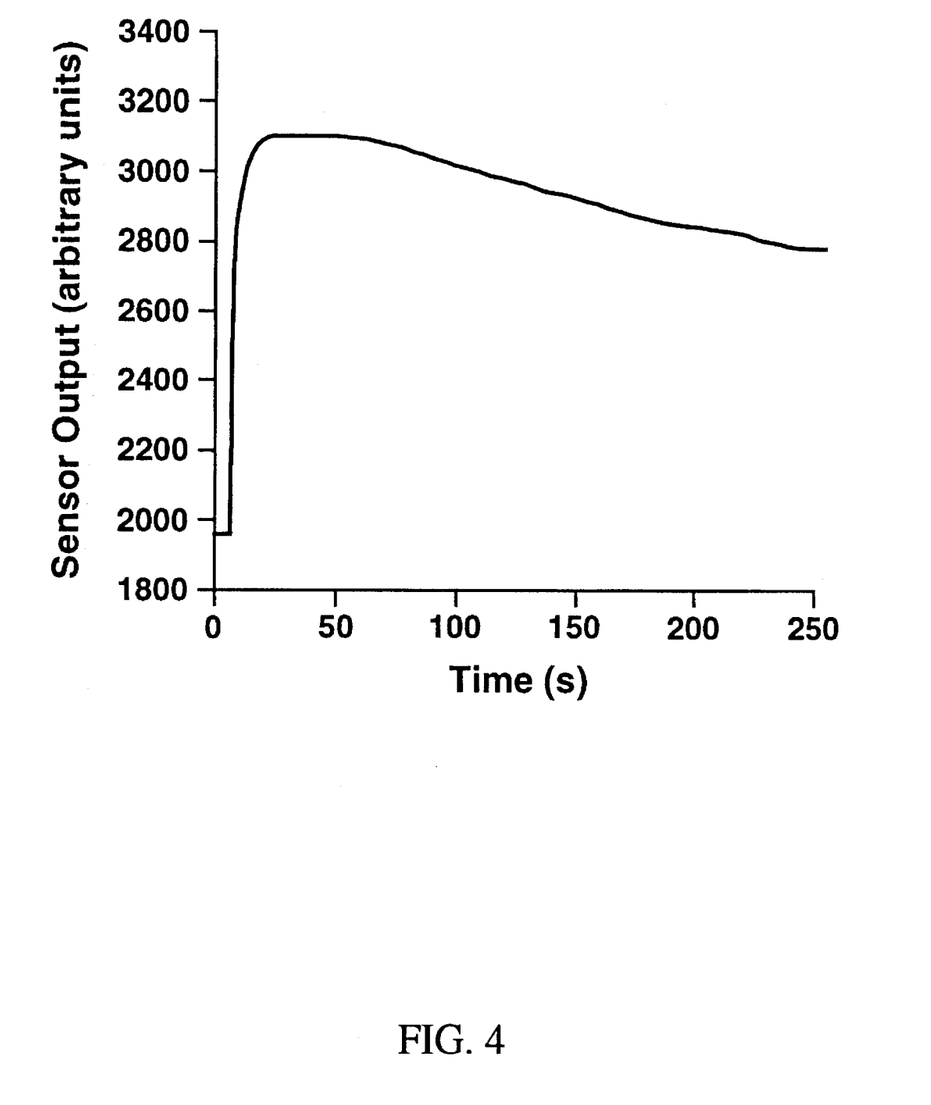
FIG. 4 is a graph of sensor output during application and drying of spray paint for the sensor of Example 1.

The capability of the FPD sensor of the invention was demonstrated in an experiment involving the application of a coating of dielectric paint on a plastic substrate. A sensor generating only one ESV was placed in contact with the back surface of the plastic substrate, and the sensor output was monitored as a single pass of spray paint was applied. Only the amplitude data are shown in FIG. 4, since the phase data were not recorded. The output signal rose dramatically with the application of the paint. As the paint dried, the amplitude signal decreased to a lower, stable level. The 0.001" thick layer of paint on the 0.125" thick plastic substrate caused an appreciable change in the electrical properties of material within the sensor ESV, resulting in signal amplitude changes. Additionally, this experiment demonstrates that changes in the properties of thin dielectric layers, such as the paint drying, are measurable using this technique. Because this configuration did not involve multiple, patterned, dielectric layers, it was not necessary to use multiple ESV sensors. More complicated configurations, such as those used in FPDs, require the use of multiple ESVs to discriminate between multiple layers in spatially-resolved patterns.

EXAMPLE 2

Figure 5:
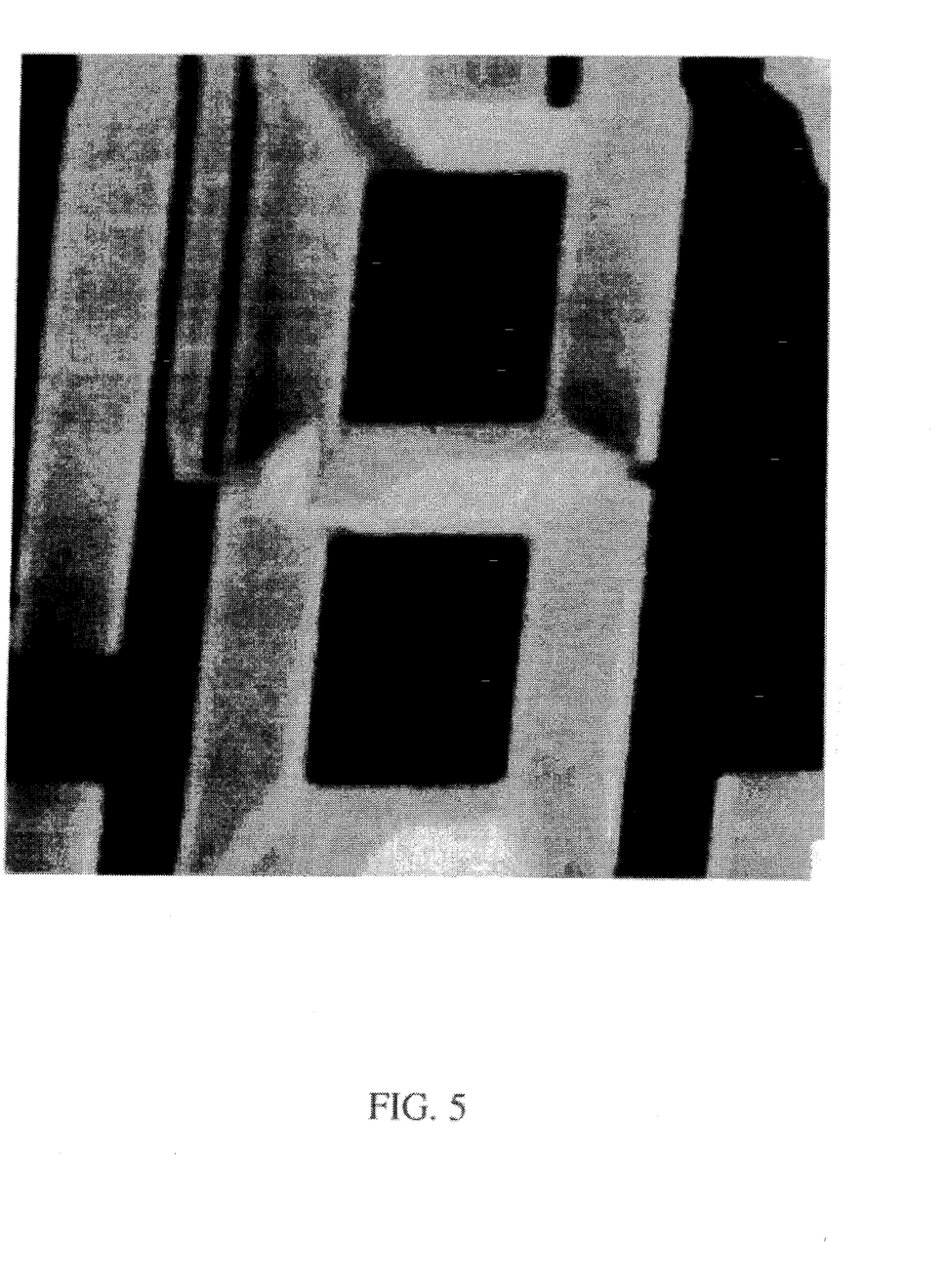
FIG. 5 is an amplitude image of indium-tin oxide conductors in a liquid crystal display, the image taken in accordance with Example 2.

Another experiment using a similar sensor was performed to demonstrate the ability to sense conductive materials beneath a dielectric layer. In liquid crystal displays, indium-tin oxide (ITO) is deposited on a glass substrate to form the conductive electrode patterns. This transparent conductor layer is protected with a thin dielectric coating. By mechanically scanning a single sensor over the ITO electrodes, while in contact with the dielectric, the phase image in FIG. 5 was obtained. Although not shown, the amplitude information is clearly different from that of the phase image, particularly at the edges. In particular, the phase image has the effect of enhancing the boundaries of the conductor.

EXAMPLE 3

Figure 6:
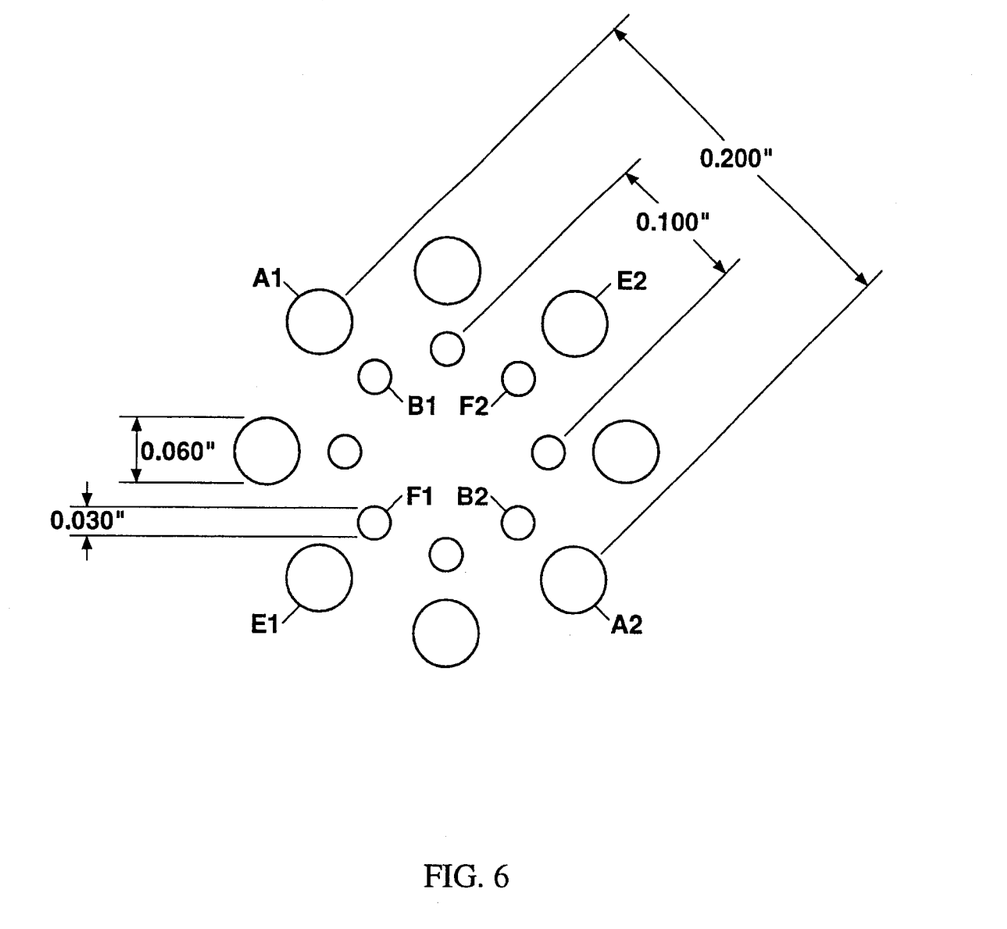
FIG. 6 is a diagram of an embodiment of the present invention combining features of the embodiments of both FIGS. 1 and 2.

A prototype sensor incorporating rotating electric fields and different size effective sensing volumes (ESV) was fabricated using printed-circuit board techniques. The electrode pattern is shown in FIG. 6. To form individual sensors, pairs of electrodes were electronically selected using an on-board multiplexer. Sensor A, for example, was activated by electronically connecting electrode A1 to an oscillator, and electrode A2 to the input of a charge amplifier. The directional electric field generated between A1 and A2 formed the sensing field. Another smaller sensor was electronically selected by using electrodes B1 and B2. This field, while in the same rotational orientation as sensor A, exhibited a smaller ESV due to the small electrode diameter and reduced spacing. The orientation of the field relative to the part being analyzed could be changed by selecting electrodes E1 and E2. Sensors A and E have the same ESV, because the electrode diameter and spacing are identical. However, these sensors have fields which are offset by 90 degrees. Using this property, electronic multiplexing between sensors A, C, E and G, would effectively produce a rotating field with a fixed ESV. Similarly, sensors B, D, F, and H could be used to produce a rotating field sensor with a smaller ESV.

A prototype sensor of FIG. 6 with electrode dimensions and spacings as shown was constructed and tested on a sample of graphite-epoxy composite material. This sample consisted of multiple woven mats of carbon fibers impregnated with epoxy resin. The sensor was placed in contact with the top layer of epoxy which completely coated the fiber mat. The sensor was mechanically scanned over a 20 by 20 mm region of the sample in 0.250 mm increments. At each point, four impedance values corresponding to electrode pairs A, B, E, and F were recorded. The four 40 by 40 arrays of impedance values are plotted as greyscale Images A, B, E, and F in FIGS. 7A–7D, respectively. The images were taken from identical regions of the sample—differences in the data are strictly due to variations in the size and orientation of the respective sensor's electric field.

Sensor A (electrode pair A1 and A2) produces an electric field which is relatively long and directional, extending from the upper left to the lower right in FIG. 6. This field interacted more strongly with fibers in the composite sample running at this same orientation, leading to the dark stripes running from upper left to lower right in Image A (see FIG. 7A). Because the interelectrode distance between electrode pair B1 and B2 is smaller than the weave of the fabric, Sensor B produces a more radially-symmetric electric field. This field interacted with the fiber web more uniformly, and produced the evenly-spaced crosshatched pattern in Image B (see FIG. 7B).

Figure 7A:
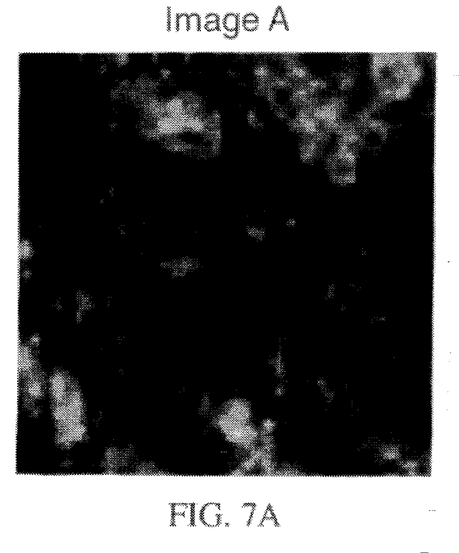
FIGS. 7A–7D are a set of images of a graphite-epoxy composite material taken by the embodiment of FIG. 6 as described in Example 3.
Figure 7B:
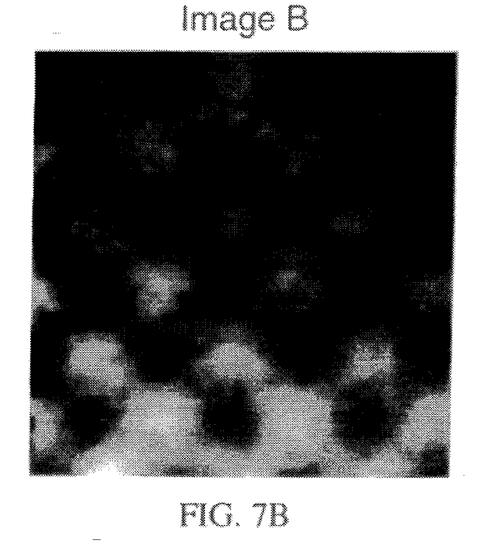

The difference between Images A and B is due to the difference in the effective sensing volume (ESV) for Sensors A and B. The electric fields used in these two sensors have the same rotational orientation, but they differ in size due to the different center-to-center separation and electrode size in Image B. By modeling the extent of the associated ESVs, the two images may be processed to generate new information about the composite material that is either located in the common volumes, or located in the volume "shell" comprising the difference between the two ESVs. This allows one to identify properties of the composite as functions of the depth into the material.

Figure 7C:
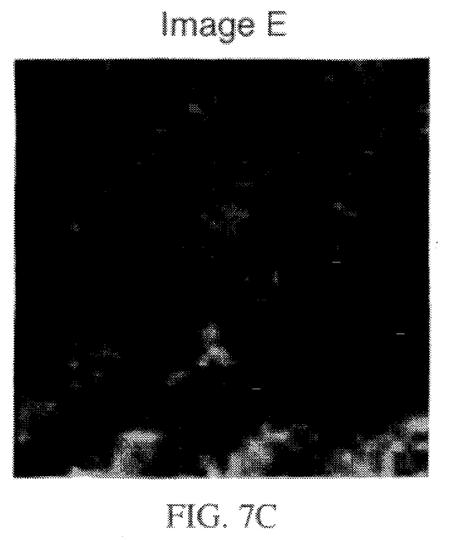
Figure 7D:
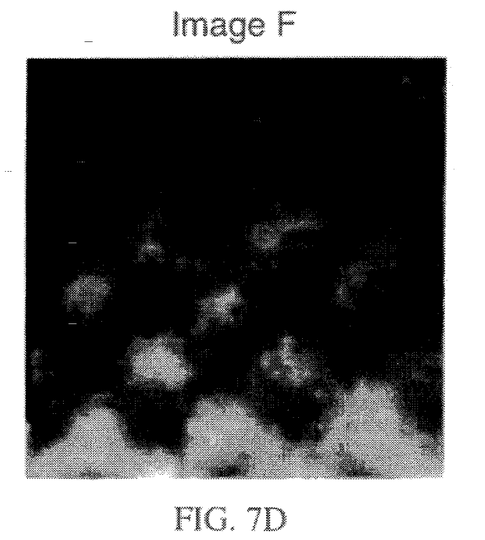

Image E in FIG. 7C was acquired using Sensor E, which generates an electric field rotated 90 degrees with respect to Sensor A. The directional field of Sensor E interacts more strongly with fibers running from the lower left to the upper right of Image E, producing dark bands. These bands are oriented 90 degrees from those in Image A. The smaller ESV of Sensor F results in the cross-hatched Image F in FIG. 7D. Notice that Images B and F are different—the brightest areas in Image B correspond physically to the lightest regions in Image F. Although the ESVs of Sensors B and F are the same, the difference in their orientation allows a measurement of the relative alignment of the individual fibers making up the woven fabric.

These data demonstrate that the shape and orientation of the electric fields used for impedance imaging dramatically affects the information acquired. Sensors with identical orientations with respect to an anisotropic material, but with different ESVs produce images which may be used to measure material properties versus depth into a sample. By rotating the sensor electric field, the impedance measurement can detect oriented features, including the directionality of embedded reinforcing fibers. Finally, by creating a pattern of electronically-switched electrodes to form different sensors, a single array device can quickly acquire information from differently-shaped fields, producing information about many aspects of a part under test.

EXAMPLE 4

The present invention is also useful in sensing flaws in woven fabrics, such as dropped threads, stress fractures, double threads, etc. Flaws in large sheets of fabric can cause significant financial loss to the weaver. Early detection of flaws reduces the area of flawed fabric, and hence the profitability of the weaving enterprise. An amplitude image is the preferred data achievable with the present invention for the fabric flaw detection application.

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, and of the corresponding application(s), are hereby incorporated by reference.

What is claimed is:

1. An impedance sensing apparatus comprising:
   a plurality of drive electrodes in contact with a surface of a sample material;
   one or more sense electrodes in contact with the surface of the sample material;
   one or more signal sources connected to said drive electrodes such that each of said drive electrodes operates only at periodic intervals or with different electrical phases; and
   means connected to said one or more sense electrodes for determining an impedance value between at least one of said sense electrodes and at least one of said drive electrodes.

2. The apparatus of claim 1 wherein said plurality of drive electrodes are placed in a ring about a single sense electrode.

3. The apparatus of claim 2 wherein said plurality of drive electrodes comprises four arcuate drive electrodes and said one or more signal sources cause each of said four arcuate drive electrodes to operate in sequence for equal intervals.

4. The apparatus of claim 1 wherein each of said drive electrodes is paired with a unique sense electrode.

5. The apparatus of claim 4 wherein at least one of said pairs is spaced at a distance different than that of at least one other of said pairs.

6. The apparatus of claim 5 wherein said determining means determines impedance values at different depths within the sample material.

7. The apparatus of claim 6 wherein said pairs are placed to form a ring.

8. The apparatus of claim 7 wherein said pairs are placed in a plurality of concentric rings.

9. The apparatus of claim 1 additionally comprising compensation circuitry for enhancing a dynamic range by selective amplification of small signals of interest.

10. The apparatus of claim 1 wherein said one or more signal sources comprise one or more oscillators.

11. The apparatus of claim 1 wherein said apparatus generates a rotating electric field.

12. The apparatus of claim 1 wherein said apparatus generates an effective sensing volume by the overlap of electric fields generated by two pairs of drive and sense electrodes.

13. The apparatus of claim 1 additionally comprising feedback control means for controlling a layer thickness or uniformity of the sample material during manufacture thereof.

14. The apparatus of claim 1 wherein the sample material comprises a continuous sheet of material.

15. The apparatus of claim 14 wherein the sheet of material comprises a woven fabric.

16. The apparatus of claim 1 wherein the sample material comprises a composite material formed from a plurality of different substances.

17. The apparatus of claim 1 wherein the sample material comprises a substrate having one or more material layers formed thereon.

18. The apparatus of claim 17 wherein at least one of the material layers is a patterned layer.

19. The apparatus of claim 1 wherein a distance between one or more pairs of drive and sense electrodes is smaller than a spacing of oriented features within the sample material.

20. A method of sensing an impedance, the method comprising the steps of:
   a) providing a plurality of drive electrodes in contact with a surface of a sample material;
   b) supplying one or more sense electrodes in contact with the surface of the sample material;
   c) connecting one or more signal sources to the drive electrodes such that each of the drive electrodes operates only at periodic intervals or at different electrical phases; and
   d) determining an impedance value between at least one of the sense electrodes and at least one of the drive electrodes.

21. The method of claim 20 additionally comprising the step of enhancing a dynamic range by providing compensation circuitry for selectively amplifying small signals of interest.

22. The method of claim 20 wherein the connecting step comprises connecting one or more oscillators.

23. The method of claim 20 additionally comprising the step of generating a rotating electric field.

24. The method of claim 20 additionally comprising the step of generating an effective sensing volume by the overlap of electric fields generated by two pairs of drive and sense electrodes.

25. The method of claim 20 additionally comprising the steps of mechanically scanning the sample material and acquiring an impedance mapping thereof.

26. The method of claim 20 additionally comprising the steps of acquiring an impedance mapping of the sample material via an array of sense electrodes.

27. The method of claim 20 wherein the providing step comprises placing the plurality of drive electrodes in a ring about a single sense electrode.

28. The method of claim 27 wherein the providing and connecting steps comprise providing four arcuate drive electrodes and connecting the four arcuate electrodes and the one or more signal sources such that the four arcuate drive electrodes operate in sequence for equal intervals.

29. The method of claim 20 wherein the providing step comprises the step of pairing each of the drive electrodes with a unique sense electrode.

30. The method of claim 29 wherein the pairing step comprises spacing at least one of the pairs at a distance different than that of at least one other of the pairs.

31. The method of claim 30 wherein the determining step comprises determining impedance values at different depths within the sample material.

32. The method of claim 31 wherein the pairing step comprises placing the pairs to form a ring.

33. The method of claim 32 wherein the pairing step comprises placing the pairs in a plurality of concentric rings.

34. The method of claim 20 additionally comprising the steps of mapping the sample material and locating flaws or inhomogeneities therein.

35. The method of claim 34 wherein the step of mapping the sample further includes a step for image processing to enhance features of the sample material.

36. An impedance sensing apparatus comprising:

a plurality of drive electrodes;

a plurality of sense electrodes, each sense electrode forming in combination with a unique one of the drive electrodes an electrode pair;

one or more signal sources connected to said drive electrodes such that each of said drive electrodes operates only at periodic intervals or with different electrode phases; and means connected to said one or more sense electrodes for determining an impedance value between at least one of said electrode pairs.

37. The apparatus of claim 36 wherein said pairs are placed to form a ring.

38. The apparatus of claim 36 wherein at least one of said pairs is spaced at a distance different than that of at least one other of said pairs.

39. The apparatus of claim 38 wherein said determining means determines impedance values at different depths within a sample material.

* * * * *